US006697944B1

(12) United States Patent
Jones et al.

(10) Patent No.: US 6,697,944 B1
(45) Date of Patent: Feb. 24, 2004

(54) DIGITAL CONTENT DISTRIBUTION, TRANSMISSION AND PROTECTION SYSTEM AND METHOD, AND PORTABLE DEVICE FOR USE THEREWITH

(75) Inventors: Thomas C. Jones, Redmond, WA (US); Billy Brackenridge, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/411,166

(22) Filed: Oct. 1, 1999

(51) Int. Cl.[7] .................................................. H04L 9/00
(52) U.S. Cl. ............................ 713/168; 705/1; 705/50; 705/56; 705/57; 713/2
(58) Field of Search ............................... 705/1, 50, 56, 705/57; 713/2, 168

(56) References Cited

U.S. PATENT DOCUMENTS

| | | | |
|---|---|---|---|
| 4,200,770 A | 4/1980 | Hellman et al. | |
| 5,629,980 A | 5/1997 | Stefik et al. | |
| 5,634,012 A | 5/1997 | Stefik et al. | |
| 5,638,443 A | 6/1997 | Stefik et al. | |
| 5,715,403 A | 2/1998 | Stefik | |
| 6,236,971 B1 * | 5/2001 | Stefik et al. | 705/1 |
| 6,327,652 B1 * | 12/2001 | England et al. | 713/2 |

OTHER PUBLICATIONS

"The Ability to Promote and Sell and Track . . . "; Brochure, 8 pages; Liquid Audio, Redwood City, CA; ©1999.
"The Ability to Send and Receive and Share . . . "; Brochure; 8 pages; Liquid Audio, Redwood City, CA; ©1999.
A Piece of the Tick; Pamphlet; 39 pages; InterTrust Technologies Corp.; Sunnyvale, CA; ©1997–1998.
An Introduction to Information Security; 18 pages; Certicom, Mississaugua, Ontario; ©1997.
Get Connected With the MP3Plus Authoring & Application Developer Kits, at http://www.intertust.com/products/mp3plussheet.html, (last visited Mar. 15, 1999), 3 pages.
Duncan Shaw, The Lack of Copyright Protection Hinders the Growth of Electronic Commerce, at http://www.rightsxchange.com/docs/press/art_1.html; (last visited Mar. 15, 1999), 3 pages.
Digital Rights Management; at http://www.rightsxchange.com/docs/comm/comm.html, (last visited Mar. 15, 1999), 1 page.
InterTrust Intends to Participate in the RIAA Secure Digital Music Initiative, at http://www.intertrust.com/news/prarchive/sdmi.html, (last visited Mar. 15, 1999), 2 pages.
Technology, at http://www.intertrust.com/technology/tech.html, (last visited Mar. 15, 1999), 7 pages.
Elliptic Curve Cryptography Question & Answers; Brochure; 2 pages; Certicom Corp; 1997–1998.

* cited by examiner

Primary Examiner—James P. Trammell
Assistant Examiner—Daniel L Greene
(74) Attorney, Agent, or Firm—Leydig, Voit & Mayer, Ltd.

(57) ABSTRACT

A digital content file distribution, transmission, and protection system comprises a digital content provider having stored therein a digital content file such as an audio file, video file, literature, program file, etc. The digital content provider includes an authentication interface and a USB port from which the digital content file may be downloaded. The system also contemplates a portable device to which the digital content file will be transferred. This portable device includes an authentication interface and a USB port, and conforms to the USB storage device class. The portable device communicates with the digital content provider via the USB interface and, pending the establishment of a trusted relationship, downloads the digital content file therefrom. The establishment of the trusted relationship with the portable device is accomplished through communications between the authentication interfaces over the USB. If the level of the trusted relationship is high, the digital content provider may transmit unencrypted digital content to the portable device without fear of violation of the DRM associated with this content. A medium level requires some form of encryption, and a low level only allows downloading of digital content with a low level requirement for DRM. The digital content provider may be a PC, a kiosk, a server, etc.

58 Claims, 9 Drawing Sheets

DIGITAL CONTENT DISTRIBUTION, TRANSMISSION AND PROTECTION SYSTEM AND METHOD, AND PORTABLE DEVICE FOR USE THEREWITH

TECHNICAL FIELD

This invention relates generally to a system and method for the distribution, transfer, and protection of digital content, and, more particularly relates to a system and method for implementing digital rights management in the distribution and transfer of digital content files to ensure proper protection and prevent unauthorized duplication thereof.

BACKGROUND OF THE INVENTION

The world is clearly leaving the industrial age and entering the digital information age. Personal computer ownership is at an all time high, and the rise in the popularity and usage of the Internet has exceeded even the most optimistic view of computer developers. This increased computer ownership and usage of the Internet have encouraged the development and growth of a system of e-commerce which allows consumers to now shop, bank, book travel, etc. from the comfort of their own home twenty-four hours a day, seven days a week, via the Internet. However, because the Internet was designed for digital content transfer of information it is quite poor at delivering physical products such as a toaster which may have been purchased online through e-commerce. Most of these physical "products" still require shipping, handling, etc. to bring them in the hands of the consumer, even though the display, description, and actual purchase takes place via the Internet.

While physical products still require elements of traditional commerce to complete their acquisition, "information" products may fully exploit the medium of the Internet to allow for a total e-commerce selection, purchase, and delivery cycle. Since the Internet was developed to transfer digital information, a natural extension into the e-commerce realm exists for these information products which are themselves or may be remastered as digital information. While it would be naive to attempt to fully list all products which may be termed "information products", such a definition would certainly include digital music, literature, financial services, software programs, games, video, etc. Through the Internet a consumer may shop for, sample, read technical specifications about, purchase, and download the particular information product of his or her choice all through the home computer without leaving the comfort of the home twenty-four hours a day, seven days a week. This is but one example of true and complete e-commerce.

One area of information products which has seen an explosive growth is the music or audio area. While the term digital content information products covers much more than simply music as indicated above, the recent growth and availability of digital content audio files and the widespread availability of free software downloadable from the Internet to play these audio files on a home PC allows a description of this particular digital information product to point out the risks and impediments to the full development of a total e-commerce system for the purchase and transfer of digital content information products via the Internet. Additionally, while it is recognized that there are various formats of audio digital content information products available, including AC-3, AAC, MS Audio, Liquid Audio, MP4, etc., the most popular at this point appears to be the Motion Picture Experts Group Audio Level 3 (MP3) format. Because of its current widespread use and universal understanding of its operation, this format will be used in the following description, recognizing that such description is exemplary of such digital content information products in general.

The MP3 format for audio compression and digital transfer via the Internet is a compressed digital format for near CD quality audio at 16 k bytes per second. This format compresses digital music into much smaller, denser files which can move across the Internet quickly and be transferred to a personal computer's hard disk without taking up too much room. Prior to the advent of the MP3 format, high quality computer sound files were typically in WAV format. However, such a WAV file providing high quality sound reproduction for a 3 minute song would take up to about 30 megabytes of hard disk space and would actually require several hours to transmit over the Internet at normal speeds. However, this same song in MP3 format would require only about 2 megabytes of space on a hard disk and may be transferred across the Internet in mere minutes instead of hours. The desirability of this MP3 format is further enhanced by the widespread availability of free MP3 software to both generate and play MP3 format audio files. Additionally, several thousand MP3 format digital content audio files are also freely available for download from the Internet from various artists with many more available for purchase. These factors have combined to the point where one of the major Internet search engines has reported that searches for MP3 files is second only to searches for the keyword 'sex'.

Recognizing that the demand for MP3 format audio digital content files will likely spawn demand for players of such files, several manufacturers have developed and released, or are in the process of releasing, portable players which are capable of playing these MP3 files. With such portable players consumers will be able to realize the benefits of this format away from their PCs. In the short term, these portable players will most likely utilize rotating media to store the MP3 files, however, more expensive players will most likely use flash RAM for storage of the digital content audio files. While the PC is still the primary player for MP3 audio digital content files, soon these portable devices will be able to connect directly to the Internet, or possibly capture audio from direct digital broadcasts. Currently portable players connect to the PC via parallel or serial ports, however, this is not seen as being sustainable into a mass marketed product because configuration of these ports is too complicated for a consumer product.

Despite, or maybe because of, the ease of transfer and quality of these MP3 digital audio content files, the music industry as an industry has not embraced the availability of this channel of commerce. In fact, the Recording Industry Association of America (RIAA) has filed court action to block the distribution of a portable MP3 player. The reason for such a move stems from the fear of bootleg piracy and copyright violations which may be possible with current MP3 technology. Specifically, MP3 files contain digital content which may be easily copied without reduction in quality of the audio information contained therein. Therefore, the music industry is concerned that pirates will violate the industry's or artists' copyrights by posting bootleg copies of songs on the Internet in this format for free. The industry is concerned that such high quality bootleg copies will add significantly to their estimated 5 billion dollars in losses due to bootleg piracy with conventional media. Therefore, until these copyright issues are resolved, the full utilization of the e-commerce potential for the sale and transfer of digital content files will not be realized.

SUMMARY OF THE INVENTION

The system of the instant invention overcomes these and other known problems existing with the current state of digital content transfer and distribution.

More specifically, the system of the instant invention provides a new and useful system of digital content distribution, transfer, and protection of digital content information files which allows for the full development and exploitation of the e-commerce capabilities of the information age. Further, the instant invention provides a portable player for use with such a system which will fully protect the digital content information files transferred to and stored therein. Additionally, the instant invention provides a protocol and method of communicating between a digital content provider host and a portable device for establishing a trusted relationship with the portable device ensuring that the copyright of the digital content information file will be respected. This is accomplished in the instant invention through the definition of a new authentication interface for the USB.

The instant invention also teaches a data structure for the digital content file which includes licensing or certification information along with the digital content data itself.

The inventive concepts and teachings disclosed by this invention, therefore, involve a system and components for the download and protection of digital content which will allow the mass marketing of portable digital players such as the MP3 audio player, e-books, etc. Specifically, and utilizing the MP3 audio player platform as an exemplary embodiment, the system of the instant invention will facilitate the sale and download of music (or other digital content) via the Internet, from a kiosk, etc. While the invention will be described in this summary utilizing the portable MP3 audio player device, it is recognized that other formats such as AC-3, AAC, MSAudio, etc. are available and may benefit from the system of the instant invention. Additionally, the system of the instant invention will likewise provide security for other digital content such as e-books, movies, software, etc. To understand the necessity, advantages, and full scope of the invention, a brief recapitulation of the problem currently hindering the full development of the market for digital content is instructive. As the Internet continues to expand and provide more and more consumer services, the desire to utilize this medium for consumer purchases becomes apparent. Since the Internet is structured to provide a transfer of digital information, it may be used as a retail outlet mechanism for digital content providers such as the music industry, literary publishers, movie producers, software developers, etc. Of these potential sources of digital content, the music industry has taken the lead in utilizing this medium through the widespread dissemination of audio players which may be downloaded to a user's PC. However, because the digital content may be so easily copied, the music industry has not fully embraced this medium as a safe channel of distribution for its digital content. Before the music industry, or any other industry for that matter, will fully utilize the potential of digital content transfer via the Internet a system of digital rights management (DRM) which protects this digital content must be provided. Further, this system of digital rights management must be provided for both the PC and the host of portable audio players which are being introduced onto the market and which will allow the full exploitation of the market potential for digital content audio, video, text, etc.

The system of this invention, therefore, provides such a system of digital rights management which protects the digital content in both the PC (or other host) and portable player. As indicated above, this system is suitable for any digital content, but will be described utilizing an audio embodiment, such as a portable MP3 player. A portable MP3 audio player incorporating the system of the instant invention will preferably utilize a universal serial bus (USB) and will conform to the storage device class as established by the USB Device Working Group for Audio. The portable MP3 audio players may use a variety of storage media such as rotating media, flash RAM, etc., and may provide various levels of playback capability including playback of fully encrypted files, personalized encrypted files, and clear-text files. The system of the instant invention, therefore, first needs to determine the type of portable audio player to which it will transfer the digital content. This requires both host and portable device systems to establish a trusted relationship therebetween so that the system which will be providing the digital content (e.g., a PC or kiosk) may determine the level at which the portable player may be trusted.

The level of trust which is established between the host or digital content provider and the portable device determines the type of digital content file which may be downloaded. Specifically, if a high level of trust is established between the host and the portable device, clear text files may be transferred to the portable device for playback. This high level of trust signifies that the portable device will provide protection of this clear text digital content, preventing its further dissemination to other players without appropriate compensation to the digital content provider. Other players may include "personalized" decryption capability wherein a digital content file may be encrypted with the device's public key prior to the transfer of that information to the portable device. The portable device is then able to decrypt the digital content information prior to playback using its private key. This type of device may be thought of as providing a medium level of trust. If a portable device cannot confirm that it will provide protection for clear text files, a low level of trust is established. In this case, only fully encrypted (full DRM) digital content may be transferred to this device. Digital content which does not require DRM or which has a low level DRM requirement may also be transferred to these players, such as the currently available free digital content.

This level of trust relationship is established between the host and portable device through an interrogation/response system of communication between the host and the portable device. This system is initiated by the host transmitting a query to the portable device requesting device information. The portable device responds with its device description identification along with a flag which indicates "I can authenticate". In response to the "I can authenticate" flag, the host generates a challenge to the portable device in an attempt to ascertain its level of trust. The portable device then creates a unique response based on the challenge which includes its ID and is digitally signed. Based on this unique response and the digital signature information transmitted from the portable device, the host makes a decision, accepting assertions, to determine the level of trust of the portable device. Since communications over the USB to the portable device are considered intra-system communications, no separate encryption of these communications is required, allowing a much simpler and less expensive player. As indicated above, if the level of trust is determined to be high, clear text digital content may be transmitted over the USB to allow playback in the portable device. However, if a lower level of trust is established, such as may be the case if the portable device utilizes removable media to store the digital content files, clear text files may not be transmitted to the portable device. It is noted however that a high level of trust allows for the lowest cost and battery consumption portable device as such device need not include any decryption circuitry to allow playback of the digital content stored therein.

A system of trust certification may be provided with the portable device. While there are many trusted authorities which may issue such trust certifications, Certicom has made a proposal to the USB audio device working group for a certificate scheme based on their elliptic curve cryptography. Depending on the particular structure of the portable device, the Certicom certificate will either allow the system of the instant invention to safely pass a key that will allow the device to decrypt the file after it has been downloaded to the portable device or will guarantee that the portable device will protect the clear content of the digital content downloaded thereto. The above-described authentication and establishment of a level of trust will be implemented via a new interface since the USB storage device class does not provide any way for certification or key exchange. This new interface is termed an authentication interface, and will be in addition to the USB storage interface which is well defined for the USB storage device class.

The system of the invention also includes file management as a key feature. This feature allows the utilization of the existing file system to prevent unauthorized download and modification of the digital content files. Under this file management the host or PC will have only directory and delete access to the protected files in the portable device. These protected files include the clear text files downloaded under the system of the instant invention. If the portable devices are relatively "dumb" devices, the system of the instant invention may require that a file system trap be utilized to prevent file operations such as rename and delete operations. However, in portable devices which include a higher level of intelligence this file system trap may be eliminated. Once the trust relationship has been established with the portable device, five more messages will become valid through the authentication interface in addition to the normal file system commands. These new messages include PROTECT_FILE <filename>, UNPROTECT_FILE <filename>, LIST_PROTECTED_FILES, ZERO_PROTECTED_FILE <filename>, and DECRYPT_PROTECTED_FILE <filename>, <key>.

In summary, the system of the instant invention combines concepts of digital rights management (DRM) with a trust authentication and file protection system for host and portable devices communicating over a USB. The scope of this invention includes the overall system of providing the DRM, as well as the individual elements of the host system and the portable device system. Additionally, the invention teaches a new protocol directed to the method of communicating between the host and portable device, as well as broader data transmission concepts directed to the method of establishing the trusted relationship and the file transfer. Additionally, the teachings of the invention include the data structure of the digital content file including license or certification header information.

Additional features and advantages of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
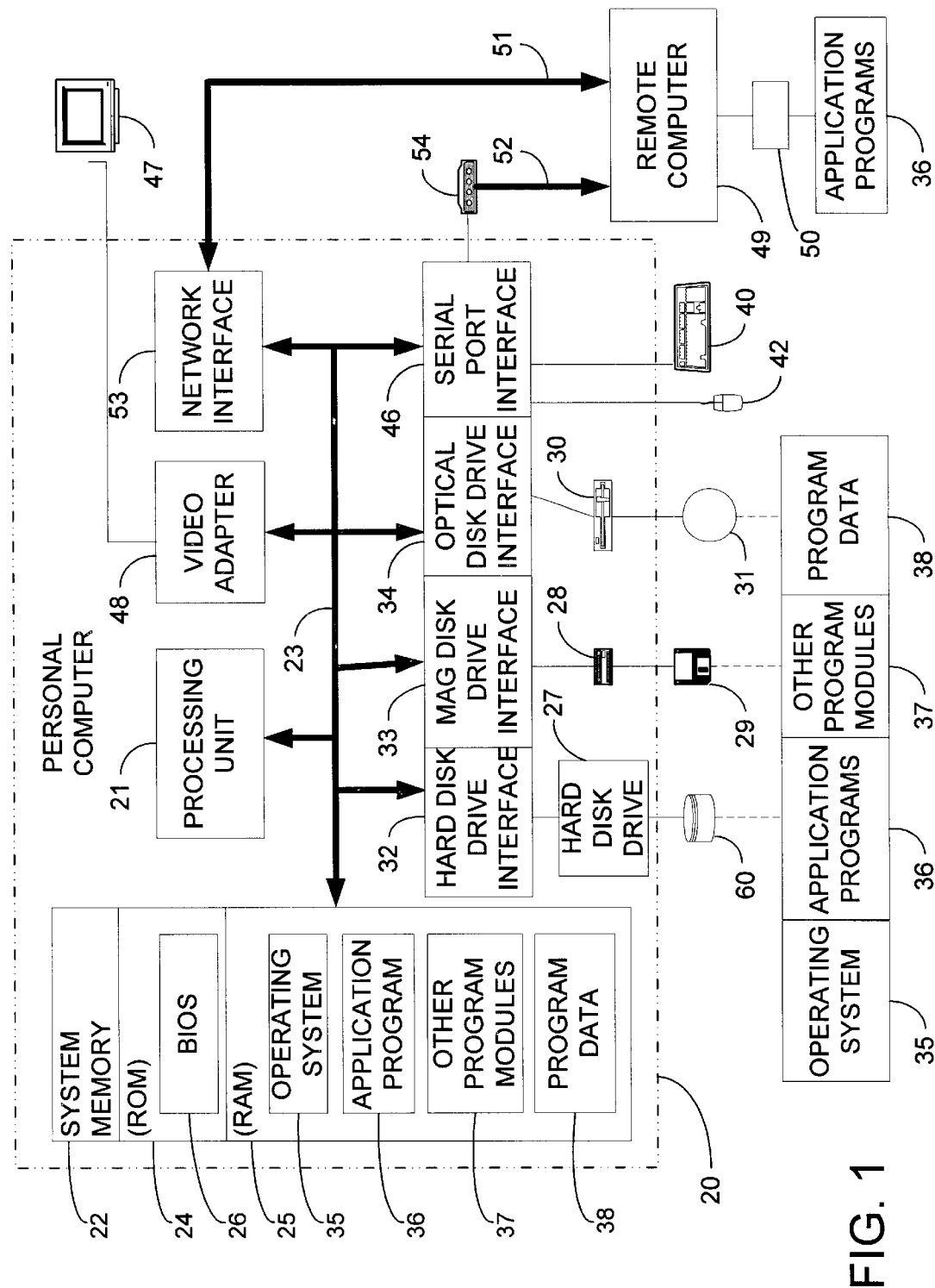
FIG. 1 is a block diagram generally illustrating an exemplary computer system on which the present invention resides.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the personal computer 20, such as during start-up, is stored in ROM 24. The personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the personal computer 20. Although the exemplary environment described herein employs a hard disk, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, and the like may also be used in the exemplary operating environment.

A number of program modules may be stored on the hard disk, magnetic disk 29, optical disk 31, ROM 24 or RAM 25, including an operating system 35, one or more applications programs 36, other program modules 37, and program data 38. A user may enter commands and information into the personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices, not shown, such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the person computer 20 typically includes a modem 54 or other means for establishing communications over the WAN 52. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by one or more computer, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Figure 2:
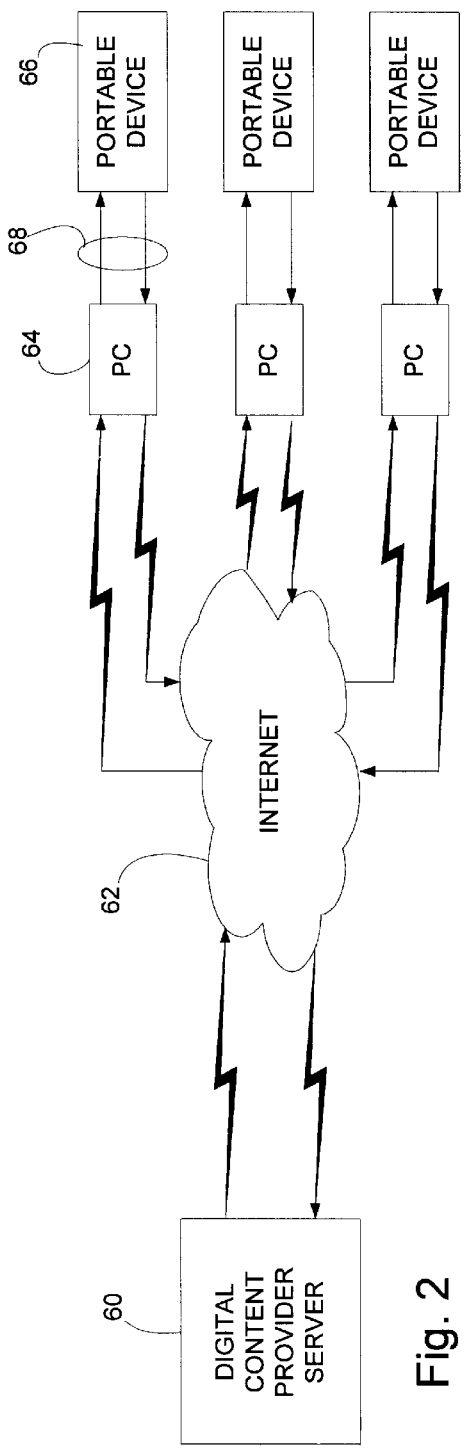
FIG. 2 is a simplified block communications diagram illustrating an embodiment of the instant invention.

In accordance with the invention, FIG. 2 illustrates a simplified communications block diagram in accordance with the instant invention. As may be seen, a digital content provider, such as an online publisher, record label, movie studio, etc. maintains a server 60 which is connected to the Internet 62. The digital content provider server 60 maintains the content provider's website which may provide a catalogued list of all digital content files which are available for purchase and/or download via the Internet 62. As discussed above, this digital content may take the form of audio, video, literature, software programs, etc. While recognizing that the particular content is not a limiting feature of the invention, for ease of discussion and understanding, the remainder of the discussion will focus on digital content audio files. Also as recognized above, there are several formats of compressed digital, near CD quality audio currently available including AC-3, AAC, MS Audio, MP3, MP4, etc. As with the particular content, the compression technique utilized is also not a limiting feature of the invention. However, to simplify the description of the invention, the MP3 format will be used in the following discussion, recognizing that the inventive techniques may be utilized within a digital content and any format applied.

Continuing with the illustration of FIG. 2, once the digital content provider has posted his website on the Internet 62, consumers may connect therewith via a personal computer 64. The number of consumers who may connect to the digital content provider's website is limited only by the band width and capabilities of the digital content provider's server 60 as is known in the art. Once connected to the digital content provider's website, the user may browse the offerings provided thereon. Once the user has identified a particular selection, or for exemplary discussions, a song which the user wishes to purchase and download, the digital content provider's server 60 may immediately download the audio file to the user's personal computer 64 via the Internet 62, or may first interrogate the user's PC 64 to determine the level at which this device 64 is to be trusted with the digital content audio file. With the first option (download without interrogation) the audio file will typically be provided with some form of encryption which will limit the user's ability to engage in illegal redistribution of the content. Several such techniques are known in the art including digital watermarking or transactional watermarking which allow unlimited playback but restrict permissible copying to one time. Another technique would be to use a user's public key to encrypt the digital content audio file such that its playback could only be effectuated by the user's PC 64 by decrypting the digital content with its private key during playback. Other techniques may be appropriate for this initial download without interrogation.

As an alternative to simply downloading a digital content file to a user's PC 64, the digital content provider server 60 may first interrogate the user's PC 64 to determine a level at which this device 64 is to be trusted with the digital content file. The process for this determination will be described in greater detail below with regard to FIGS. 8 and 9. However, suffice it to say at this point that if the interrogation reveals that the user's PC 64 does not incorporate sufficient safeguards therein for the protection of the copyright which is associated with the digital content file, this file will be downloaded to the user's computer only with full digital rights management techniques employed. These techniques, as described briefly above, may incorporate encryption, digital and transactional watermarking, etc. to prevent the wholesale redistribution and pirating of the downloaded file. Alternatively, if the interrogation reveals that the consumer's PC 64 contains public key encryption technology, the file may be downloaded from the server 60 via the Internet 62 to the consumer's PC 64 utilizing the proper encryption technique to allow playback only on the user's PC 64. However, and as will be described in greater detail below, if the consumer's PC 64 is determined to contain appropriate safeguards to prevent the violation of the copyright of the digital content file, this file may be downloaded in non-encrypted clear text format. However, due to the insecure nature of transfers via the Internet 62, this clear text digital content transmission may not be desirable to certain digital content providers. The underlying thought for this undesirability is the possibility of a pirate intercepting the clear text transmission of the digital content file and then wholesale redistributing this content via the Internet or other medium without appropriate compensation to the digital content provider or copyright holder.

The concern of transmitting clear text digital content files via the Internet do not exist however at the level of communication between the user's PC 64 and the user's portable digital content playback device 66. Such a device may be an e-book, video player, or portable audio player. To simplify the following discussions, this portable device 66 will be described as a portable MP3 player suitable for playback of digital audio files compressed using the MP3 format. While many portable MP3 players 66 currently connect to a consumer's PC 64 via parallel or serial ports, the configuration of these ports is quite complicated for such a consumer product as indicated above. A better choice for the connection to the PC is the Universal Serial Bus (USB) 68. Since USB is self-configuring, there are no port addresses or interrupts to configure. Also, USB is very high speed having the capability of downloading an hour's worth audio in less than a minute. Additionally, the USB provides power and data connections in a single cable which is important for battery powered portable devices such as portable device 66.

To add further support for the use of USB, the USB device working group for audio has announced that it advocates use of the storage device class for portable audio devices. This will allow the various manufacturers of these portable devices 66 to utilize a common interface which will make their portable device compatible with any PC 64. This results from the USB's introduction to Microsoft's Windows operating system of the notion of a class driver. If a device conforms to the storage device class, a standard driver should work for all conforming devices. This has long been the case for disk drives, where one driver (more or less) will handle drives for many manufacturers without error. Unfortunately, the USB storage device class does not incorporate any mechanism for authentication of a level of trust with the portable device 66. This would necessitate the inclusion of full digital rights management and encryption techniques into the digital content files downloaded to the portable device 66 for playback which, in turn, would require that the portable device 66 incorporate additional decryption technology to allow playback of the digital content file. This however will increase battery consumption, cost, and complexity of the portable device 66.

As may be seen from FIG. 2, once the consumer's PC 64 has downloaded a digital content file, it may then download this digital content file to a portable device 66 via the USB interface 68 to allow the consumer to playback the MP3 audio file away from his or her PC 64. To prevent the wholesale pirating of the digital content files within the PC 64, the system of the instant invention incorporates an interrogation scheme whereby a level of trust is established with the portable device 66 prior to the transfer of the digital content file thereto. This interrogation and establishment of a level of trust will be described in greater detail with reference to FIGS. 8 and 9 below. Since portable devices 66 will be manufactured by a variety of manufacturers and distributed in multiple countries, some vendors may choose to play only encrypted files based on their own design choices or upon certain government imposed restrictions in some countries. During the interrogation process between the PC 64 and the portable device 66, the system of the instant invention will determine this based on the information provided by the portable device 66 to the PC 64. In this case, the portable device 66 provides a digital certificate to the PC 64 which then allows the PC 64 to encrypt the digital content file with a public key prior to downloading the digital content to the portable device 66. One such certificate scheme has been proposed by Certicom based on their electric curve cryptography, similar to that which runs today in smart cards and cell phones. Under this scheme, once the level of trust has been established based on the Certicom issued certificate, the PC 64 may safety pass a key that will allow the portable device 66 to decrypt the file after it has been downloaded to the portable device 66.

This interrogation will also reveal a second class of player 66 which is capable of only playing unencrypted MP3 files. Such a player does not include any digital rights management safeguards, and therefore the system of the instant invention will only download unencrypted MP3 files which are available free of charge from the digital content provider. However, since there are literally thousands of music titles available currently on the Internet without specific digital rights management requirements, the system of the instant invention will support these players as well. Examples of such a device may be the current version of the RIO available from Diamond MultiMedia.

Interrogation between the PC 64 and the portable device 66 will also reveal a third class of portable device 66. This third class of device 66 will be low cost from both a money and battery drain perspective and will most likely utilize a dedicated chip that plays MP3 audio. To minimize cost and battery drain, however, this third class of device will most likely be incapable of decrypting the data stream at the same time. However, it is desired that this third class of portable device be allowed to play all MP3 audio files including those which carry with them a requirement for digital rights management. In order to download these files to the portable device 66, a high level of trust must be established during the interrogation process. Once this high level of trust has been established, signifying that the portable device will enforce the digital rights management of the files, the PC 64 will have to decrypt the audio and load the clear text file into the player 66. A certification scheme such as that proposed by Certicom may be utilized to guarantee that the device will protect the clear content of the file, allowing a PC only directory and delete access to these protected files stored therein.

Figure 5:
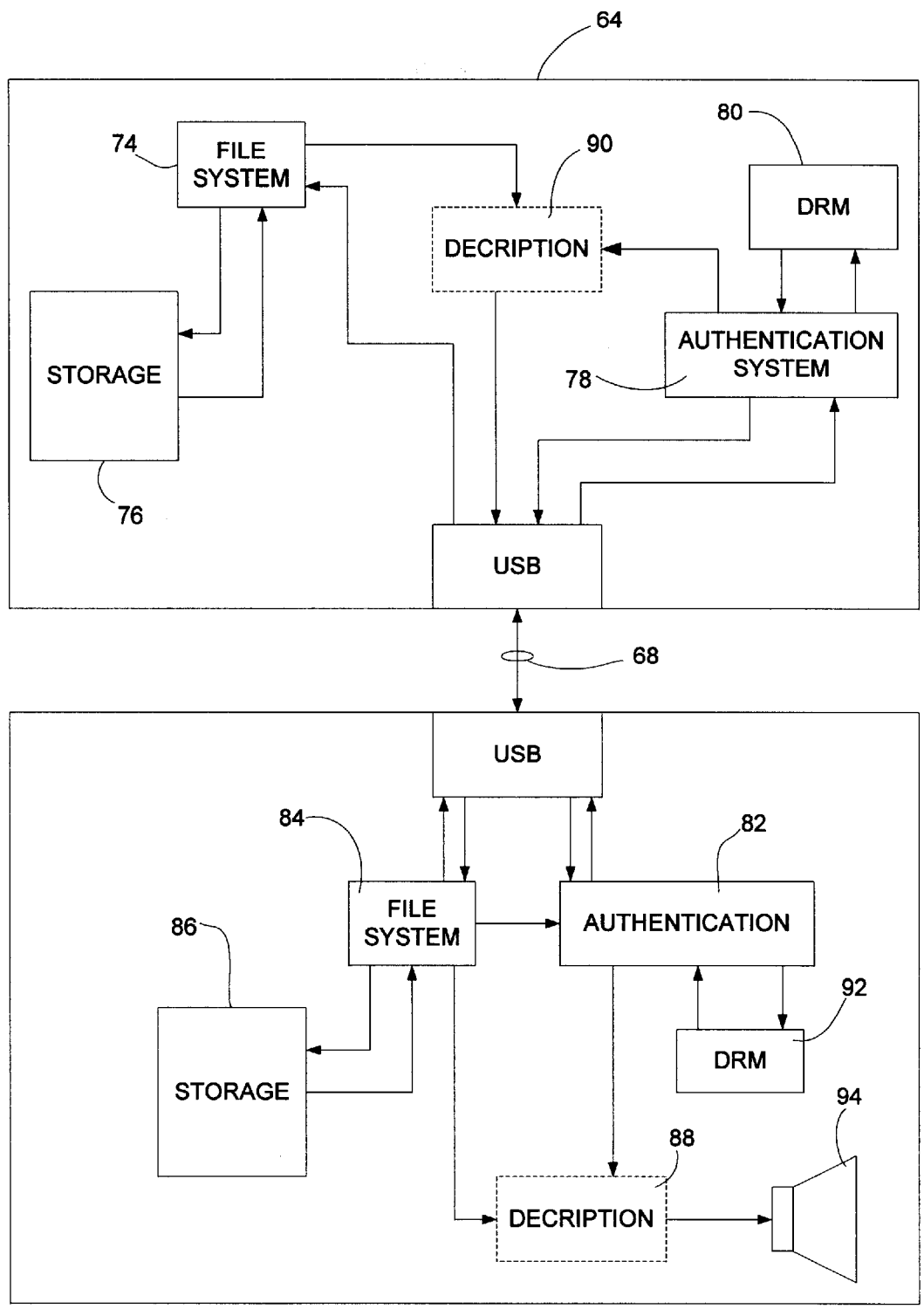
FIG. 5 is a block diagram illustrating storage and communication system elements in accordance with an embodiment of the instant invention.

However, as indicated above, the USB storage device class as it is presently defined has no method for certification or key exchange. Therefore, one aspect of the instant invention is to define a second interface for the USB storage device class called an authentication interface. A USB portable audio player such as portable device 66 that wants to play encrypted files or receive files that were previously encrypted must implement the authentication interface as defined herein as well as the storage interface of a common USB storage device class. This authentication interface will be defined more fully below with reference to FIGS. 5 and 6.

Figure 3:
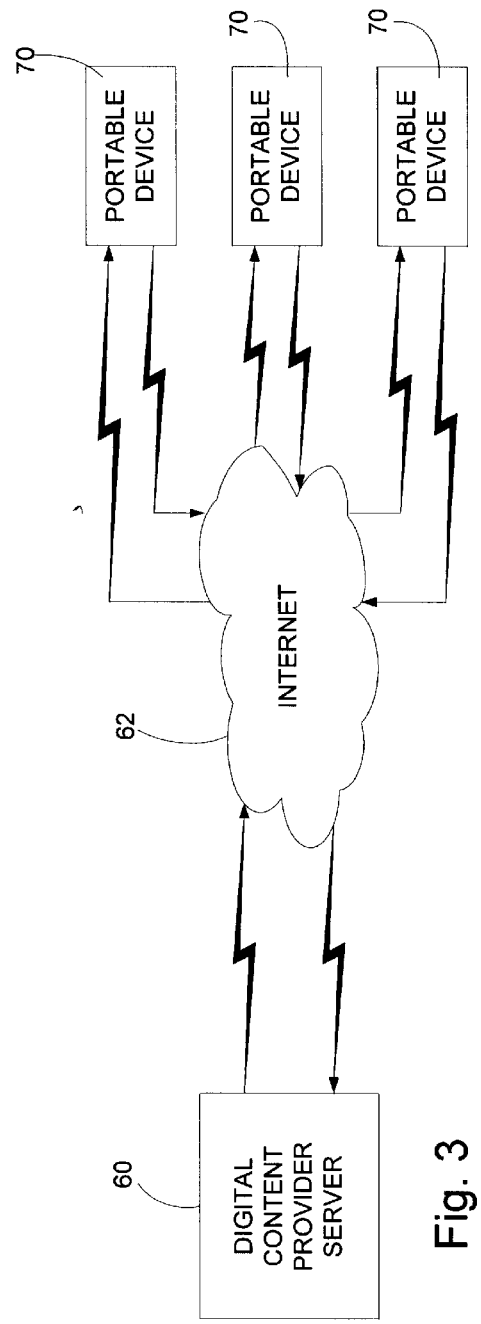
FIG. 3 is a simplified block communications diagram illustrating an alternate embodiment of the instant invention.

As portable digital content playback devices 68 continue to evolve, they may incorporate the ability to connect directly to the Internet 62 to access the digital content provider server 60 to allow direct purchase and download of digital content therefrom as illustrated in FIG. 3. Since these evolved portable devices 68 may be of each of the three classes described above, the digital content provider will need to interrogate the portable devices 68 to determine the level at which to trust these devices prior to downloading the digital content file. Specifically, if the portable device 68 is capable of only playing unencrypted digital files and incorporates no digital rights management, the server 60 may wish to only download those digital files which do not require active digital rights management. Alternatively, if the portable device 68 is determined to be a trusted device, the digital content file could be encrypted with the portable devices public key, or in the case of a certification establishing the level of trust, a key could be passed to the portable device 68 to allow decryption of the digital content file upon playback. If, as a result of the interrogation of the portable device 68, it is determined that a high level of trust has been established, the digital content provider's server 60 may pass an unencrypted clear text digital content file to the portable device 68. However, security concerns of transferring information via the Internet 62 may limit a digital content providers willingness to transmit clear text digital content files thereacross.

Figure 4:
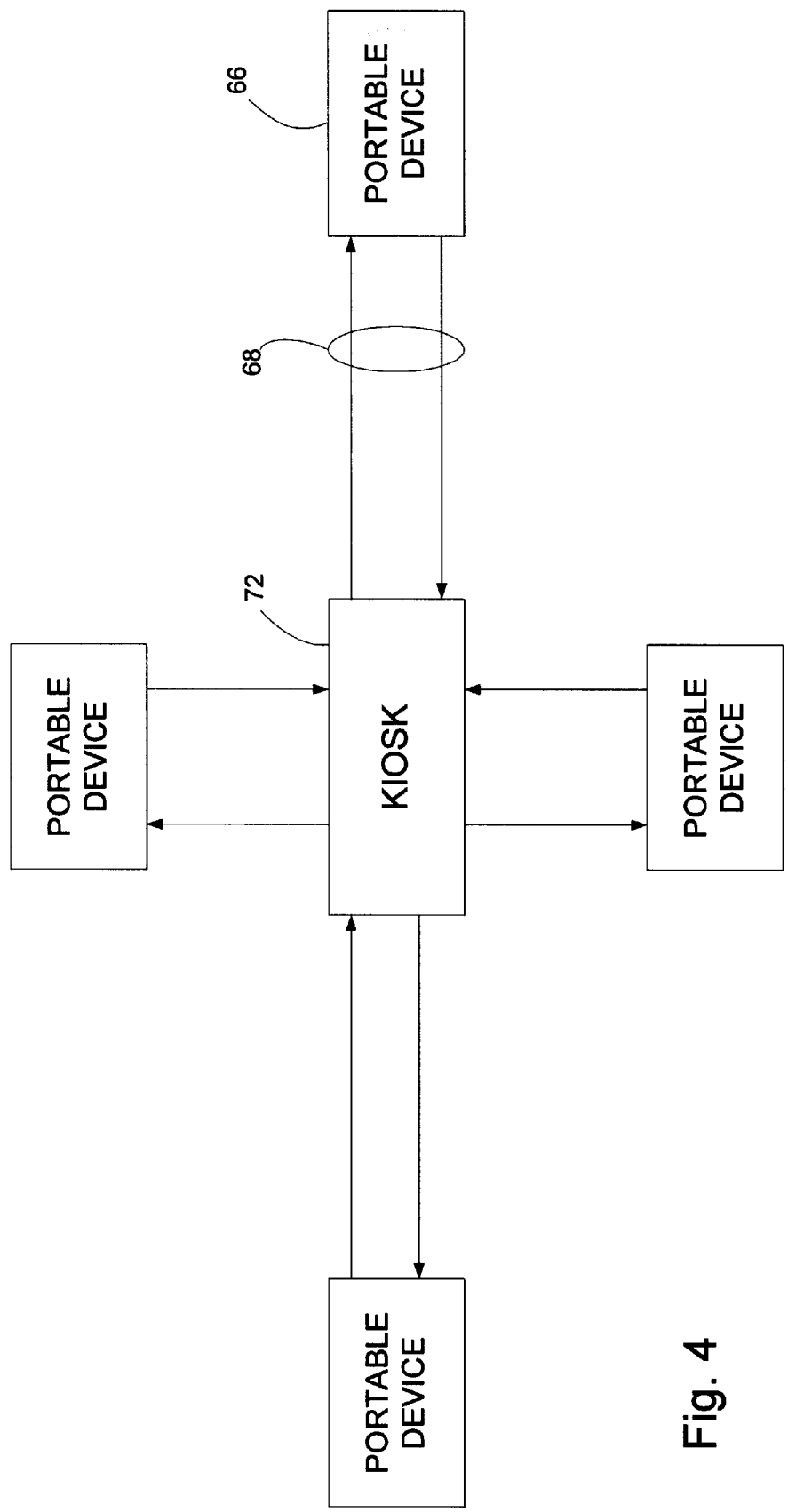
FIG. 4 is a simplified block communications diagram illustrating yet another embodiment of the instant invention.

A more desirable system for direct download to portable playback devices for many digital content providers is illustrated in FIG. 4. As may be seen, a digital content provider may provide the digital content files to a consumer's portable device 66 over a USB interface 68 from a kiosk 72. These kiosks 72 may be distributed to their current retail outlets. The kiosk 72 would engage in the interrogation of the portable device 66 to establish the level at which the portable device 66 is to be trusted as described above. To purchase and download a digital content file, a user would need only to plug in his portable device 66, select the desired digital content file, pay, and download the file directly into the portable device 66. The implementation of a payment system with the kiosk 72 could be a simple credit card authorization system is as known in the art, or may simply provide a bill for the download which could be satisfied by the payment of cash at the checkout counter.

A benefit of the system of the instant invention is that a separate computer file system for these digital content files is not required. Specifically, and with reference to FIG. 5, the typical file system 74 of the PC 64 (or kiosk 72 or digital content provider server 60) may operate in the same manner with the digital content files which require digital rights management as it does with any other file with which it deals. Specifically, the file system 74 manages the storage and retrieval from memory storage 76 and transmits the digital content file to the portable device 66 without having to know that it is downloading files to the portable player 66. To the file system 74 the portable device 66 appears as a standard disk drive to the system, and files are copied onto the disk drive in a known manner so long as the device 66 complies with the USB storage device class. The system of the instant invention also includes an authentication system 78 within the device providing the digital content file, in this illustration PC 64. This authentication system 78 communicates over the USB 68 in association with the digital rights management rules 80 stored therein.

Within the portable device 66, an authentication module 82 forming the authentication system of the portable device communicates with the authentication system 78 via USB 68 to establish the portable device's identity and level at which it is to be trusted with the digital rights management of the files downloaded thereto. Specifically, all USB interfaces have class specific descriptors and class specific requests or messages which define the class. The class specific descriptor will present a GUID indicating the certification scheme which is used with this device 66. This will aid in the determination of the level at which the device 66 is to be trusted. The GUID is the standard 16 byte GUID used by Windows. For example, a GUID may be defined to indicate that the Certicom scheme described briefly above is in use within device 66.

Once the device identity and level of trust have been established, the downloading of the digital content file may proceed. This download is controlled by the file system 84 of device 66 for storage and retrieval of the digital content files within memory storage 86. As with file system 74, file system 84 is a standard file system as well. If it is determined that the portable device 66 includes decryption capability 88, then decryption 90 of the digital content file need not be accomplished within the PC 64. However, if the portable device 66 does not have decryption capability 88, then the decryption module 90 within the PC 64 is required prior to download of the digital content file to the portable device 66. As indicated above, this is only accomplished once a high level of trust has been established with portable device 66 through the authentication system 78. The authentication module 82 thereafter enforces the digital rights management 92 within portable device 66 by preventing the file system 84 from copying the protected files.

Specifically, once the trust relationship is established between the PC 64 and the portable device 66, five authentication interface messages become valid. The first command PROTECT_FILE[filename] will cause the portable device to refuse all access to the data portion of a given file. Attempts by the file system 84 to access the data areas through UFI read or write command blocks will result in invalid parameter errors. While this should never happen with normal file access through the file system 84, it is necessary and appropriate to protect the area from raw disk access such as might be done with a disk maintenance utility. Once protected, the file will be added to the protected file list. This list of names is maintained in memory which is not accessible through the storage device. The second command which becomes available is the UNPROTECT_FILE [filename] which will remove the file from the protected file list. Once executed, the areas occupied by this file are now accessible to the PC 64. A third command which becomes available is the LIST_PROTECTED_FILES command which, as its name suggests, returns a list of the protected files stored within the portable device 66. The fourth command, ZERO_PROTECTED_FILE[filename], causes the data area of the protected file named to be zeroed. The final new command is the DECRYPT_PROTECTED_FILE[filename], [key]. Depending upon the device implementation, the portable device 66 may decrypt the named file immediately, or store the key for use when decrypting 88 the digital content file on the fly during playback over the portable devices speakers 94.

These five authentication interface commands are sufficient to build a secure file system without modification of the file system stack 84. Low level routines can grab the interface, and they can destroy the file directory, but they will not be able to get at the protected areas of memory. This should be file system independent so long as the storage device understands the file format. This scheme differs from common practice in that storage devices have also been considered stupid devices in that they have no understanding of file systems. Typical storage devices merely present a large addressable space, and it is up to the file system of the PC to organize how it is laid out. Therefore, unlike typical storage devices the portable device 66 must know the file system format in order to play the files. Because of this, the security interface does not know where the file is stored physically, but instead its location is entirely controlled by the portable device 66 as is the security of the information.

Figure 6:
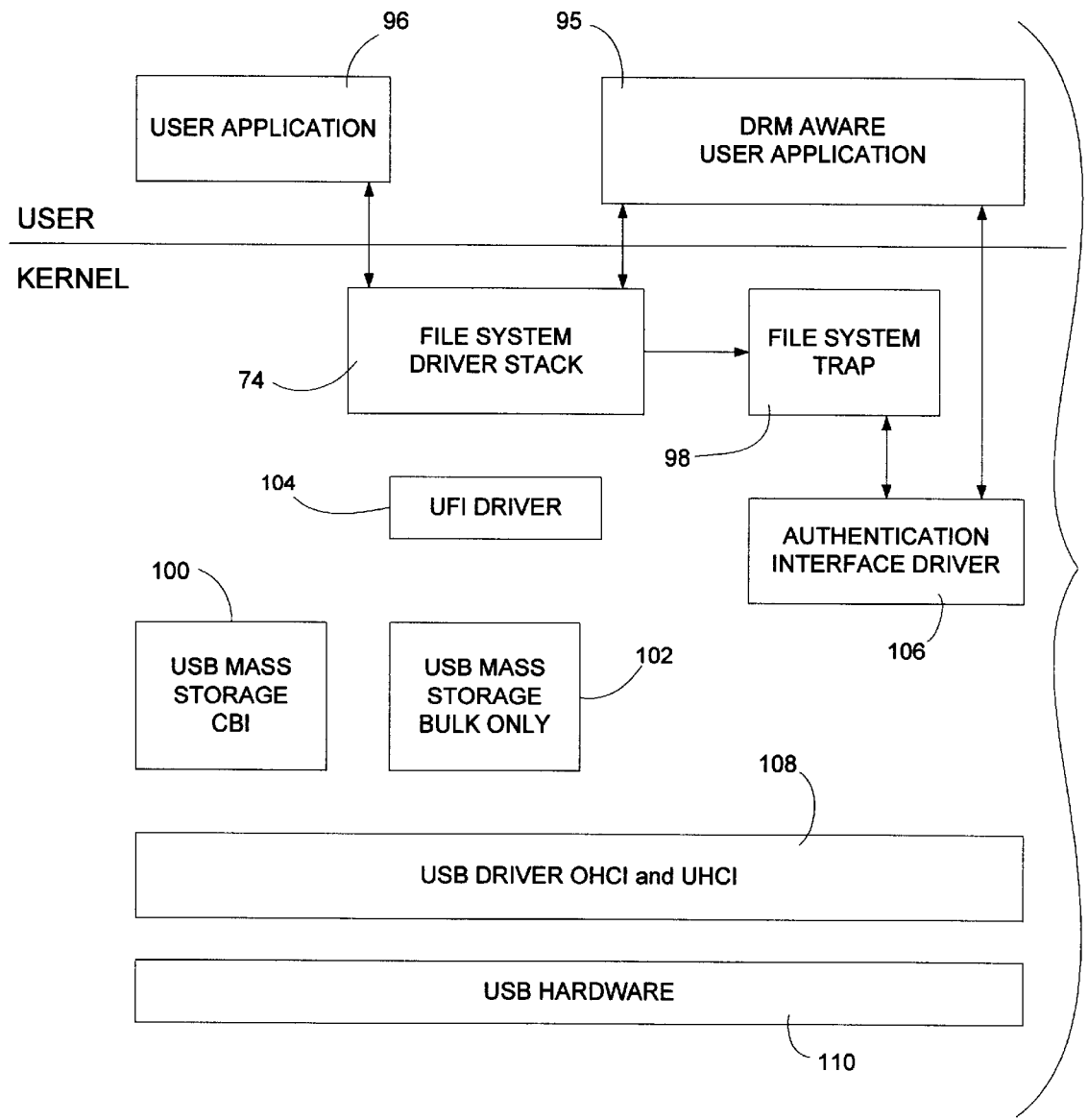
FIG. 6 is a simplified architectural diagram illustrating a system component interaction in accordance with an embodiment of the instant invention.

With this in mind, we now turn to the system diagram of the kernel modules used to implement this scheme as illustrated in FIG. 6. As may be seen, the system of the instant invention allows existing applications 96 that work with unencrypted audio files to operate as they have before without knowing that they are downloading files to a portable player as well as allowing operation of DRM aware user applications 95. As indicated above, the player appears as a standard disk drive to the system, and files are copied onto the disk drive. As an example, a standard ripper program could copy a track from a CD onto the device after compressing it. It is recognized that if the portable player uses flash RAM or rotating media, the file system code may be somewhat different, but this is immaterial to the operation of the system of the instant invention.

The file system trap 98 straddles the file system and authentication interfaces, and looks for delete and rename operations. When a user attempts to delete a file, this file system trap 98 will ensure that it is zeroed on the device before it is deleted. If a protected file is renamed, the authentication system will be informed of this by the file system trap 98. In this way, the security of the file may be maintained. Sabotaging this module 98 may cause (recoverable) file system errors, but such sabotage will not compromise the protected data. It is noted that there are two USB mass storage boxes, CBI 100 and Bulk Only 102. As will be recognized by one skilled in the art, these are two different methods of communicating over USB, and the appropriate driver will be loaded based on the descriptors presented in the portable device. The UFI driver 104 is a simplified block command protocol that has been adopted by USB storage devices. This protocol is a subset of SCSI commands. As indicated above, the authentication interface driver 106 is new to USB. USB driver 108 and hardware 110 allow communication with the portable device in accordance with the USB standard. It should be noted that the file system trap 98 may become unneeded as the portable devices become smarter by incorporating more of the digital rights management security features necessary to prevent unauthorized access to the files stored therein.

Figure 7:
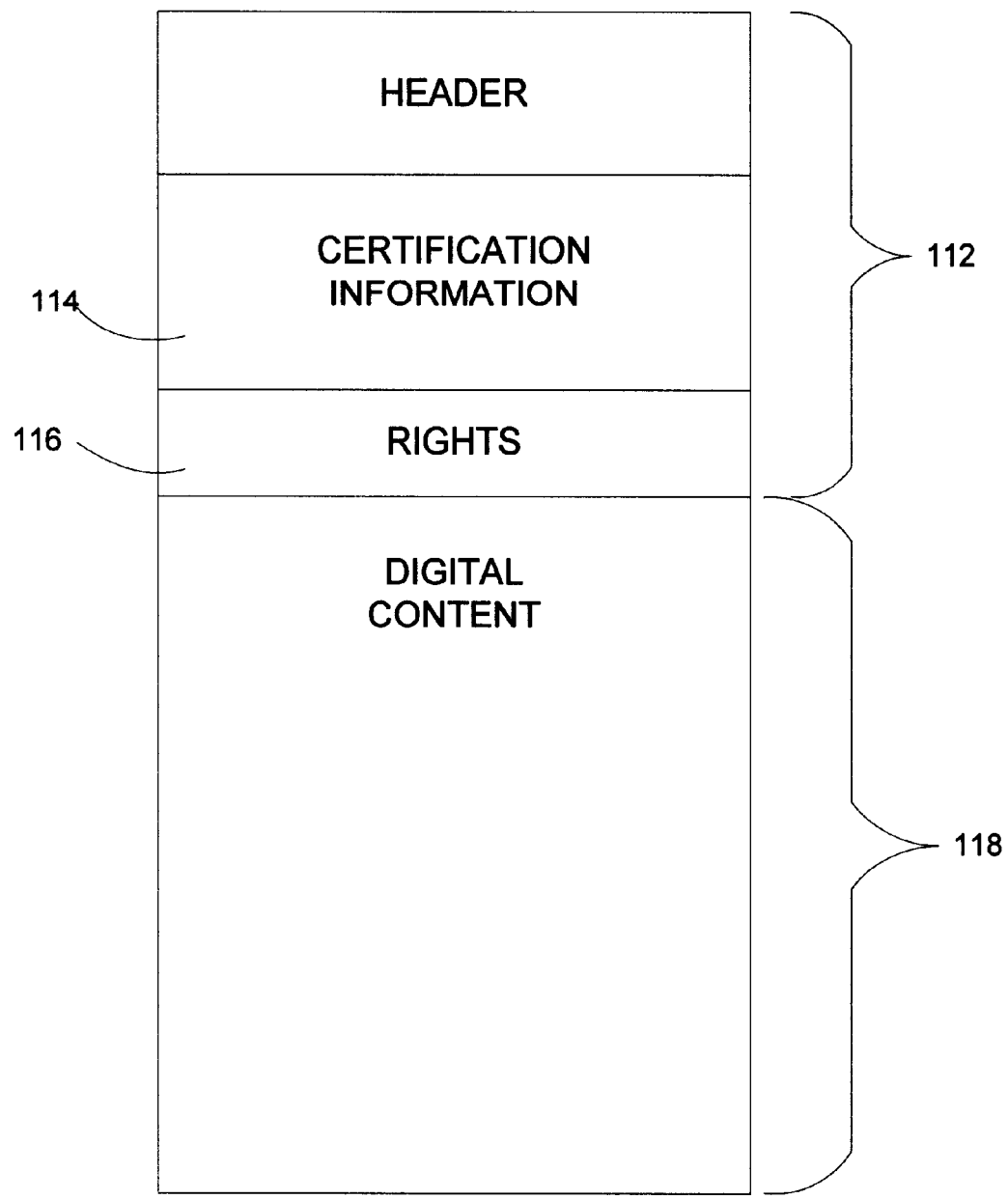
FIG. 7 is a data file structure diagram illustrating a digital content information file in accordance with the teachings of the instant invention.

While much of the foregoing description has referred to a digital content file, a particular file structure has not been defined, although the file structure of current freely available MP3 compressed audio files is widely known in the art. FIG. 7, however, illustrates a simplified data structure of a digital content file which includes DRM information therein. Specifically, FIG. 7 illustrates a typical MP3 audio file which contains a header portion 112 which includes therein certification information 114. This header portion 112 may also include digital rights information and/or commands 116 as well. Such rights information 116 may include copyright license information, etc., and may be chosen and written in the file header based upon the level of trust established between the two systems between which this file will be passed. The commands which may be placed in this area 116 may allow or restrict certain file access, transfer, copy, etc. activities which may be accomplished by the receiving system. In addition to the header portion 112, a typical file will also include a digital content portion 118 wherein is stored the digital content itself. This digital content 118 may be compressed or uncompressed, and/or encrypted or unencrypted information. The particular form of the digital content may also be determined based on the level of trust established between the two systems between which this file will be passed. The type of content is not limited by the instant invention, and includes literature, audio, video, programming instructions, etc.

Figure 8A:
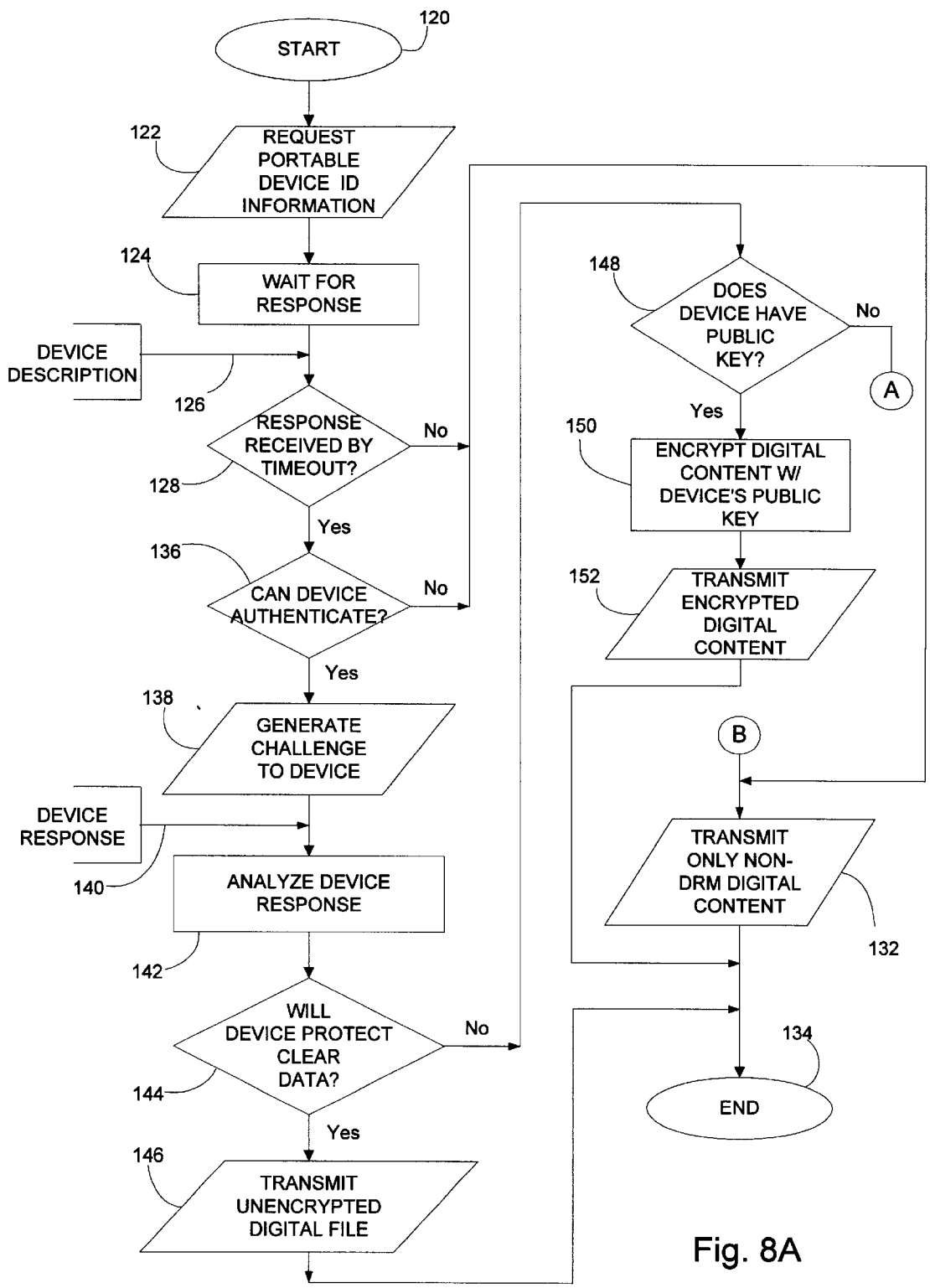
FIGS. 8A and 8B are a communication and process flow diagram illustrating operational aspects of the instant invention.
Figure 8B:
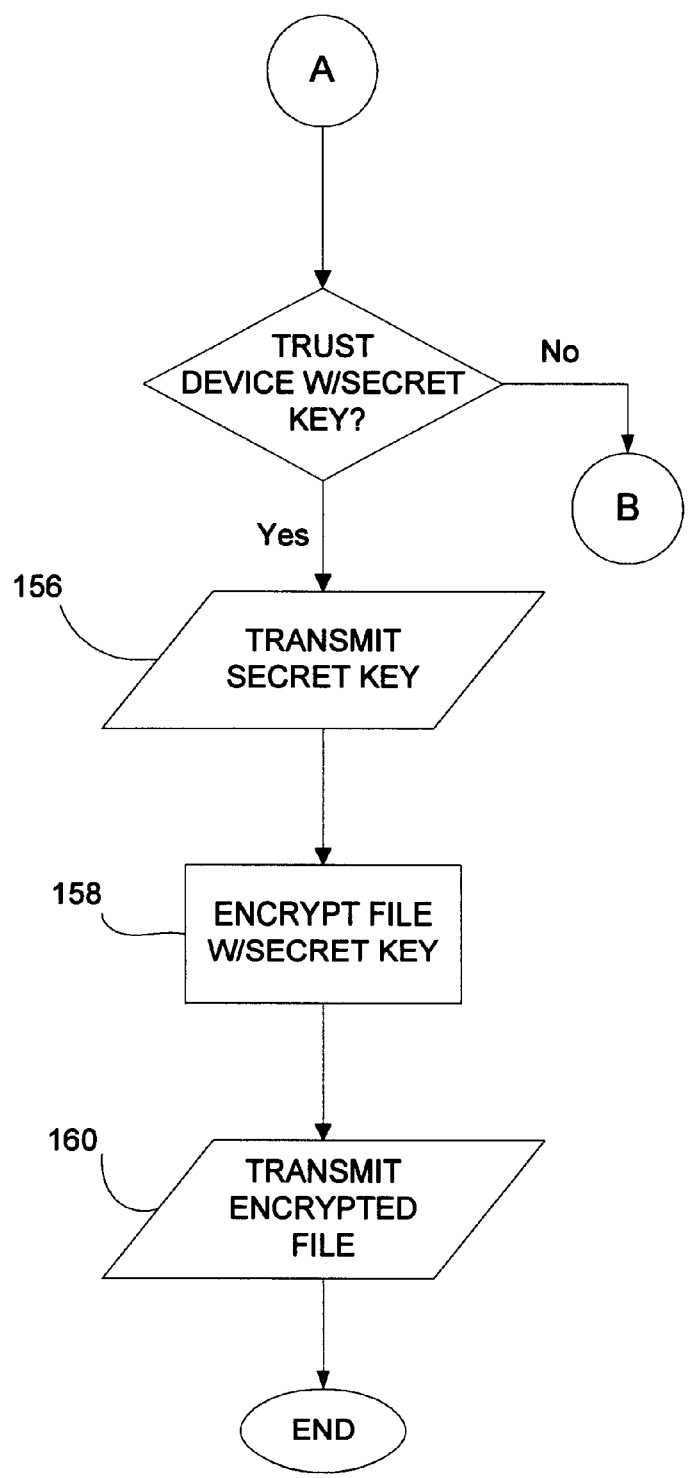

Having described the structure of various aspects of the instant invention, attention is now turned to the process for establishing the level at which the portable device will be trusted, and for transmitting the digital content in proper form to the portable device for playback thereon as illustrated in FIG. 8. Upon initiation 120 of the process, the digital content provider host (which may be the user's PC, a kiosk, or possibly the digital content provider's server) requests the portable device's ID information 122. This information will allow the digital content provider host to determine the type of portable device with which it is communicating and the features contained therein. The host then waits for a response to be received from the portable device as indicated at step 124. Decision block 128 checks to determine if a response 126 has been received within a specified time out period. If no response 130 has been received during the appropriate time out period, the host may justifiably assume that the portable device to which it will be transferring digital content files does not support a system of digital rights management, which will then lead to the conclusion that it may transmit only non DRM digital content files 132. Once the non DRM digital content files have been transmitted 132 to the portable device, the process ends 134. If, at decision block 128, a response 126 is received within the time out period, the host then checks at decision block 136 to determine if the response received from the portable device contains an "I can authenticate" flag. If the response does not contain such a flag, the host may justifiably assume that the portable device does not support a system for digital rights management as indicated above. In such a situation, the host will transmit only non DRM digital content files 132 before ending the process 134.

If, however, the response 126 received does contain the "I can authenticate" flag, the host then generates a challenge to the portable device as indicated at block 138. This challenge will be sent to the authentication interface through a class specific message. The particular length and format of the data portion of this message is dependent on the authentication scheme supported by the interface. Upon receipt of the response 140 from the portable device, the host will analyze 142 this portable device response, accepting certain assertions contained therein, to determine the level at which the portable device is to be trusted. If, based on the analysis of the device response 140, the host determines that the portable device will protect clear unencrypted digital content at decision block 144, the host will then transmit the unencrypted digital file 146 to the portable device prior to ending the process 134. If, however, the analysis of the device response indicates that the device will not protect unencrypted data, the host checks at decision block 148 to determine if the device has public key encryption support for DRM. If it is determined 148 that the portable device does support public key encryption digital rights management, the host will then encrypt the digital content file with the device's public key 150 prior to transmitting this encrypted digital content file 152 to the portable device before ending the process 134.

If the device does not support public key digital rights management, the host determines 154 if the portable device may be trusted with a secret key. This level of trust may be established through, for example, a Certicom certificate. If the portable device can be trusted with the secret key, such a key is transmitted 156 to the portable device. The digital content file is then encrypted with this secret key 158 and transmitted 160 to the portable device before the process ends 134. If, however, the host determines that the portable device may not be trusted with a secret key, the host will transmit 132 only non DRM digital content files before ending the process 134.

Figure 9:
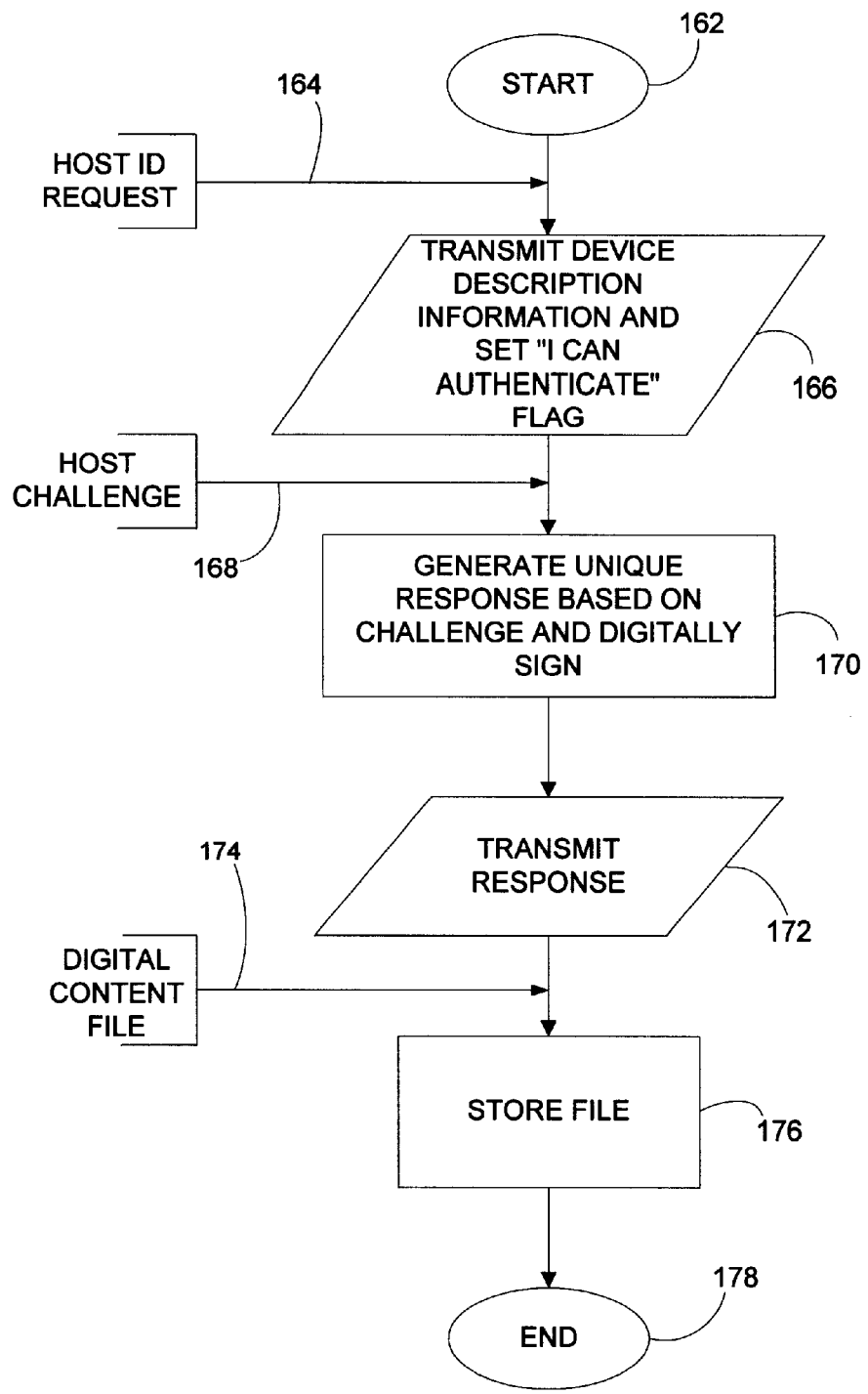
FIG. 9 is a communication and process flow diagram illustrating yet further aspects of the instant invention.

The process from the portable device side is illustrated in FIG. 9 to which specific attention is now directed. Upon initiation 162 of this process within the portable device, the request transmitted from the digital content provider host 164 is received. Upon receipt of this host ID request 164 the portable device transmits the device description information and sets the "I can authenticate" flag 166. Once this description and authenticate flag have been transmitted to the digital content provider host, the next message received is the host challenge 168. The portable device then generates a unique response based on the challenge and digitally signs this response 170 before transmission 172 to the digital content provider host. Based on this information transmitted to the host, the host will then transmit the digital content file 174 to the portable device which will then store the file 176 before ending the process 178.

All of the references cited herein, including patents, patent applications, and publications, are hereby incorporated in their entireties by reference.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

We claim:

1. A computer readable medium having computer-executable components, comprising:
    a storage component for storing a digital content file;
    a file system component for storing and retrieving the digital content file;
    a communication component for communicating via a USB port;
    a first authentication interface component for establishing a trusted relationship with a device through communications via the USB port, the trusted relationship being established at one of at least three levels of trust; and
    a digital rights management component for ensuring management of digital rights for digital content files based on an inverse relationship to the level of the trusted relationship.

2. The computer readable medium of claim 1, wherein if a level of the trusted relationship is established as high, transmitting the digital content file to the device without encryption thereof via the USB port.

3. The computer readable medium of claim 1, further comprising:
    a decryption component for decrypting digital content of the digital content file; and
    if the level of the trusted relationship is established as high, decrypting at least a portion of the digital content file, and transmitting at least the portion via the USB port.

4. The computer readable medium of claim 1, wherein if the level of the trusted relationship is established as medium, transmitting a decryption key and the digital content file via the USB port.

5. The computer readable medium of claim 1, further comprising:
    an encryption component for encrypting digital content of the digital content file; and
    wherein if the level of the trusted relationship is established as medium, encrypting at least a portion of the digital content file, and transmitting a decryption key and at least the portion via the USB port.

6. The computer readable medium of claim 1, wherein if the level of the trusted relationship is established as low, refusing to transmit the digital content file.

7. The computer readable medium of claim 1, wherein if the digital content file does not require DRM, transmitting the digital content file to via the USB port.

8. The computer readable medium of claim 1, wherein if a request for authentication is received via the USB port, transmitting identification information and an authentication flag via the USB port.

9. The computer readable medium of claim 1, further comprising:
    a decryption component for decrypting at least a portion of the digital content file to allow proper outputting thereof.

10. The computer readable medium of claim 1, wherein said file system component designates at least a portion of said storage component as protected space for storage of digital content files, said file system component further prohibiting access to the protected space.

11. A digital content distribution, transmission, and protection system, comprising:
    a digital content provider having stored therein a digital content file, said digital content provider including a first authentication interface, said digital content provider further including a first USB port;
    a portable device conforming to a USB storage device class and including a second authentication interface and a second USB port, said portable device in communication with said digital content provider via said second USB port to receive at least the digital content file therefrom; and
    wherein said digital content provider establishes a trusted relationship at one of at least three levels of trust with said portable device through communications between said first and said second authentication interfaces via said first and said second USB ports; and wherein said digital content provider ensures management of digital rights for the digital content file based on an inverse relationship to said level of said trusted relationship.

12. The system of claim 11, wherein said digital content provider is a personal computer.

13. The system of claim 11, wherein said digital content provider is a kiosk.

14. The system of claim 11, wherein said digital content provider generates a request for portable device identification information and transmits said request via said first USB port, and wherein said portable device responds to said request by transmitting identification information and an authentication flag to said digital content provider via said second USB port.

15. The system of claim 14, wherein said identification information includes a digital certificate provided by a trusted third party.

16. The system of claim 14, wherein said digital content provider generates a challenge and transmits said challenge to said portable device via said first USB port, and wherein said portable device generates a response to said challenge and transmits said response to said digital content provider via said second USB port, said digital content provider thereafter analyzing said response to establish a level at which said portable device shall be trusted.

17. The system of claim 16, wherein said level is established as high, said digital content provider thereafter transmitting said digital content file to said portable device without encryption thereof via said first USB port.

18. The system of claim 16, wherein said digital content file contains encrypted content, wherein said digital content provider further comprises decryption circuitry, wherein said level is established as high, and wherein said digital content provider decrypts at least a portion of said encrypted content and transmits at least said portion to said portable device via said first USB port.

19. The system of claim 16, wherein said digital content file contains encrypted content, wherein said portable device includes decryption circuitry, wherein said level is established as medium, and wherein said digital content provider transmits a decryption key and at least said encrypted content to said portable device via first said USB port.

20. The system of claim 16, wherein said portable device includes decryption circuitry, wherein said level is established as medium, wherein said digital content provider further comprises encryption circuitry, wherein said digital content provider encrypts at least a portion of said digital content file, and further wherein said digital content provider transmits a decryption key and at least said portion to said portable device via first said USB port.

21. The system of claim 16, wherein said portable device includes decryption circuitry utilizing a public/private key pair, said public key being transmitted to said digital content provider via said second USB port, wherein said level is established as medium, wherein said digital content provider further comprises encryption circuitry, wherein said digital content provider encrypts at least a portion of said digital content file with said public key, and further wherein said digital content provider transmits at least said portion to said portable device via said first USB port.

22. The system of claim 16, wherein said level is established as low, and wherein said digital content provider refuses to transmit said digital content file to said portable device.

23. The system of claim 16, wherein said level is established as low, wherein the digital content file does not require DRM, and wherein said digital content provider transmits the digital content file to said portable device via said first USB port.

24. The system of claim 16, wherein said level is established as low, wherein said digital content provider contains a second digital content file which does not require DRM, and wherein said digital content provider refuses to transmit the digital content file, said digital content provider further transmitting the second digital content file to said portable device via said first USB port.

25. The system of claim 11, wherein said portable device further comprises a file system stack and storage media accessible by said file system stack, said file system stack designating at least a portion of said storage media as protected space for storage of digital content files, said file system stack further prohibiting access to said protected space.

26. The system of claim 11, wherein said portable device further comprises a file system trap, a file system stack, and storage media accessible by said file system stack, said file system trap monitoring access to said storage media.

27. The system of claim 26, wherein said file system trap prohibits at least COPY and DELETE access to said storage media.

28. The system of claim 11, wherein said authentication interface includes at least one of the following commands: PROTECT_FILE <filename>; UNPROTECT_FILE <filename>; LIST_PROTECTED_FILES; ZERO_PROTECTED_FILE <filename>; and DECRYPT_PROTECTED_FILE <filename>, <key>.

29. The system of claim 11, further comprising a digital content originator maintaining a website on an Internet, said website providing access to digital content files, and wherein said digital content provider includes an Internet connection, and further wherein said digital content provider obtained the digital content file stored therein from said website via the Internet.

30. A computerized digital content provider, comprising:
   storage media;
   a file system controlling the storage and retrieval of at least one digital content file to and from said storage media;
   a USB interface;
   an authentication system enabling said file system to transfer digital content files to said USB interface in accordance with a USB storage device class, said authentication system defining an authentication interface for said USB interface wherein management of digital rights for each digital content file is based on an inverse relationship to a level of trust established by said authentication system with an external device to which the digital content file is to be provided.

31. The computerized digital content provider of claim 30, further comprising decryption circuitry operable to decrypt a digital content file during transfer thereof to said USB interface.

32. The computerized digital content provider of claim 30, further comprising encryption circuitry operable to encrypt a digital content file during transfer thereof to said USB interface.

33. The computerized digital content provider of claim 32, wherein said encryption circuitry utilizes a secret key to encrypt a digital content file, said secret key being provided by said authentication system to said USB interface.

34. The computerized digital content provider of claim 32, wherein said encryption circuitry utilizes a public key to encrypt a digital content file, said public key being provided by said authentication system from said USB interface.

35. The computerized digital content provider of claim 30, wherein said authentication interface is defined by at least one of the following commands:
   PROTECT_FILE <filename>; UNPROTECT_FILE <filename>;
   LIST_PROTECTED_FILES; ZERO_PROTECTED_FILE <filename>; and
   DECRYPT_PROTECTED_FILE <filename>, <key>.

36. The computerized digital content provider of claim 30, wherein said authentication system establishes a trusted relationship at one of at least three levels of trust with an external device in response to connection of the external device to said USB interface.

37. The computerized digital content provider of claim 36, wherein said authentication system transmits a request for identification information to the external device over said USB interface.

38. The computerized digital content provider of claim 37, wherein said authentication system transmits a challenge over said USB interface in response to receipt of an "I can authenticate" flag from the external device over said USB interface.

39. The computerized digital content provider of claim 38, wherein said authentication system analyzes a digital certificate received from the external device via said USB interface to establish said level at which to trust the external device with a digital content file.

40. The computerized digital content provider of claim 39, wherein said level is high, and wherein said authentication system enables said file system to transmit a digital content file to said USB interface without encryption thereof.

41. The computerized digital content provider of claim 39, further comprising encryption circuitry operable to encrypt a digital content file during transfer thereof to said USB interface, wherein said level is medium, and wherein said authentication system enables said file system to transmit a digital content file to said USB interface with encryption thereof.

42. The computerized digital content provider of claim 39, wherein said level is low, and wherein said authentication system prohibits said file system from transmitting a digital content file to said USB interface.

43. The computerized digital content provider of claim 39, wherein said level is low, and wherein said authentication system enables said file system to transmit only digital content files which do not require DRM to said USB interface.

44. A computerized portable device, comprising:
   storage media;
   a file system controlling the storage and retrieval of digital content files to and from said storage media;
   a USB interface;
   an authentication system regulating access to said storage media provided by said file system for transferring digital content files to and from said USB interface in accordance with a USB storage device class, said authentication system defining an authentication interface for said USB interface.

45. The computerized portable device of claim 44, wherein said authentication system includes a file system trap, said file system trap preventing at least COPY access to digital content stored on said storage media.

46. The computerized portable device of claim 44, wherein said authentication interface is defined by at least one of the following commands:
   PROTECT_FILE <filename>; UNPROTECT_FILE <filename>;
   LIST_PROTECTED_FILES; ZERO_PROTECTED_FILE <filename>; and
   DECRYPT_PROTECTED_FILE <filename>, <key>.

47. The computerized portable device of claim 44, wherein said authentication system includes a digital certificate issued by a trusted authority.

48. The computerized portable device of claim 44, further including decryption circuitry capable of decrypting encrypted digital content files in accordance with a secret key received by said authentication system via said USB interface.

49. The computerized portable device of claim 44, further including decryption circuitry capable of decrypting encrypted digital content files in accordance with a private key.

50. The computerized portable device of claim 44, wherein said authentication system transmits device identification information and an "I can authenticate" flag over said USB interface in response to a request for device identification information received on said USB interface.

51. The computerized portable device of claim 45, wherein said authentication system generates and digitally signs a unique response in response to a challenge received on said USB interface, said authentication system further transmitting said response over said USB interface.

52. A method of communication between a computer and a portable device, the computer having a digital content file stored therein, a first authentication interface, and a first USB port, the portable device conforming to a USB storage device class, having a second authentication interface and a second USB port, the method comprising:
   coupling the first USB port to the second USB port forming a USB interface;
   transmitting a request for device identification information from the first authentication interface over the USB interface to the portable device;
   setting an "I can authenticate" flag in the second authentication interface in response to receipt of the request for device identification information;
   transmitting device identification information and the "I can authenticate" flag from the second authentication interface over the USB interface to the computer;
   generating a challenge in the first authentication interface;
   transmitting the challenge over the USB interface to the portable device;
   generating a unique response to the challenge in the second authentication interface;
   transmitting the unique response over the USB interface to the computer;
   analyzing the unique response in the first authentication interface to determine a level at which to trust the portable device.

53. The method of claim 52, wherein the level is determined to be high, further comprising the step of transmitting the digital content file in an unencrypted form over the USB interface to the portable device.

54. The method of claim 53, wherein the digital content file is stored in the computer in an encrypted state, further comprising the step of decrypting the digital content file prior to the step of transmitting the digital content file over the USB interface.

55. The method of claim 52, wherein the level is determined to be medium, further comprising the steps of:
- encrypting the digital content file with a secret key;
- transmitting the secret key over the USB interface to the portable device; and
- transmitting the encrypted digital content file over the USB interface to the portable device.

56. The method of claim 52, wherein the level is determined to be medium, further comprising the steps of:
- extracting a public key from the unique response;
- encrypting the digital content file with the public key; and
- transmitting the encrypted digital content file over the USB interface to the portable device.

57. The method of claim 52, wherein the level is determined to be low, further comprising the step of refusing to transmit the digital content file over the USB interface to the portable device.

58. The method of claim 52, wherein the level is determined to be low, further comprising the steps of:
- examining the digital content file to determine its requirement for DRM; and
- transmitting the digital content file over the USB interface to the portable device only if the requirement for DRM is low.

\* \* \* \* \*